(No Model.) 2 Sheets—Sheet 1.
H. F. CRANDALL.
REEL ADJUSTING MECHANISM FOR HARVESTERS.
No. 408,463. Patented Aug. 6, 1889.
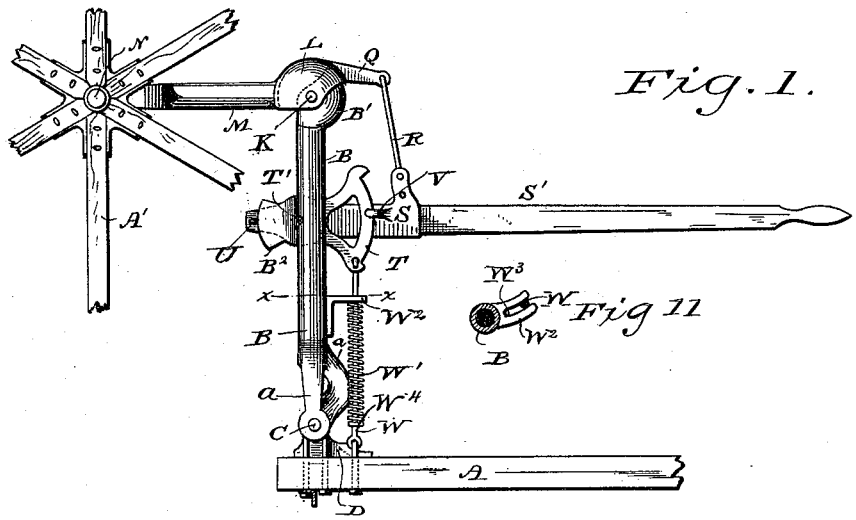
Fig. 1.
Fig. 11.
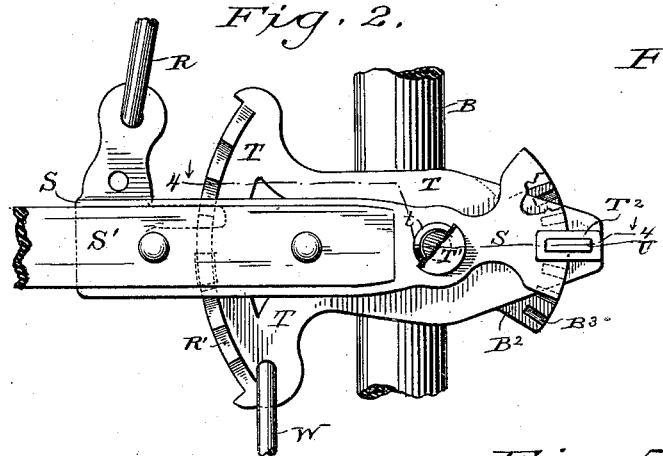
Fig. 2.
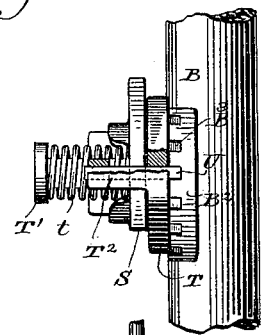
Fig. 3.
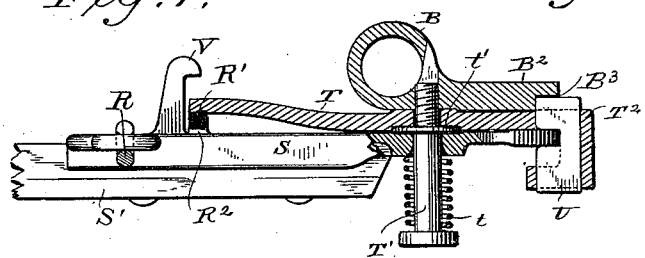
Fig. 4.
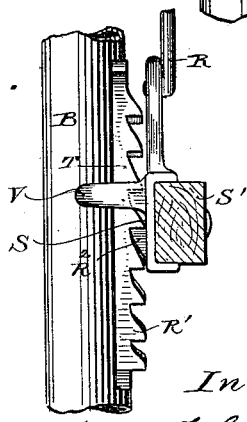
Fig. 5.
Fig. 12.
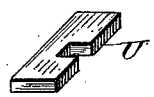
Witnesses
Geo. W. Young,
N. E. Oliphant.
Inventor
Henry F. Crandall
By Stout & Underwood
Attorneys (No Model.) 2 Sheets—Sheet 2.

H. F. CRANDALL.
REEL ADJUSTING MECHANISM FOR HARVESTERS.

No. 408,463. Patented Aug. 6, 1889.

Witnesses
Geo. W. Young
N. E. Oliphant

Inventor
Henry F. Crandall

By Stout & Underwood
Attorneys

UNITED STATES PATENT OFFICE.

HENRY F. CRANDALL, OF MILWAUKEE, WISCONSIN, ASSIGNOR TO THE MILWAUKEE HARVESTER COMPANY, OF SAME PLACE.

REEL-ADJUSTING MECHANISM FOR HARVESTERS.

SPECIFICATION forming part of Letters Patent No. 408,463, dated August 6, 1889.

Application filed November 14, 1887. Serial No. 255,064. (No model.)

*To all whom it may concern:*

Be it known that I, HENRY F. CRANDALL, of Milwaukee, in the county of Milwaukee, and in the State of Wisconsin, have invented certain new and useful Improvements in Reel-Adjusting Mechanism for Harvesters; and I do hereby declare that the following is a full, clear, and exact description thereof.

My invention relates to mechanism for adjusting harvester-reels, and will be fully described hereinafter.

Figure 6:
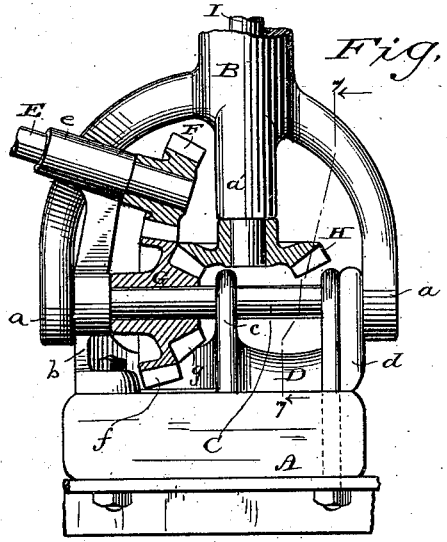
Figure 7:
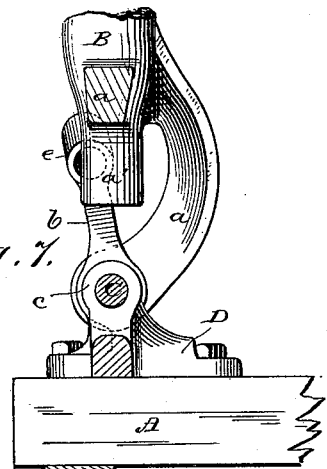
Figure 8:
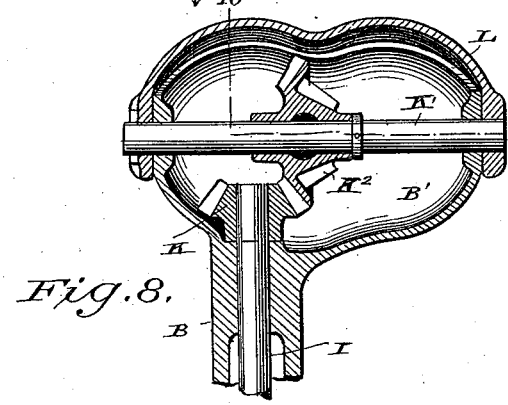
Figure 9:
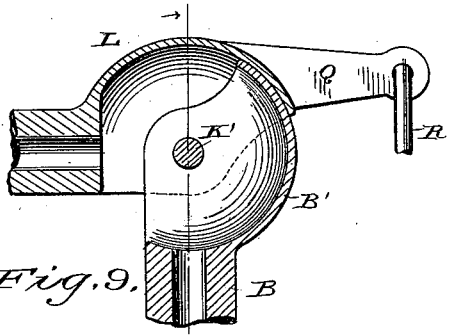
Figure 10:
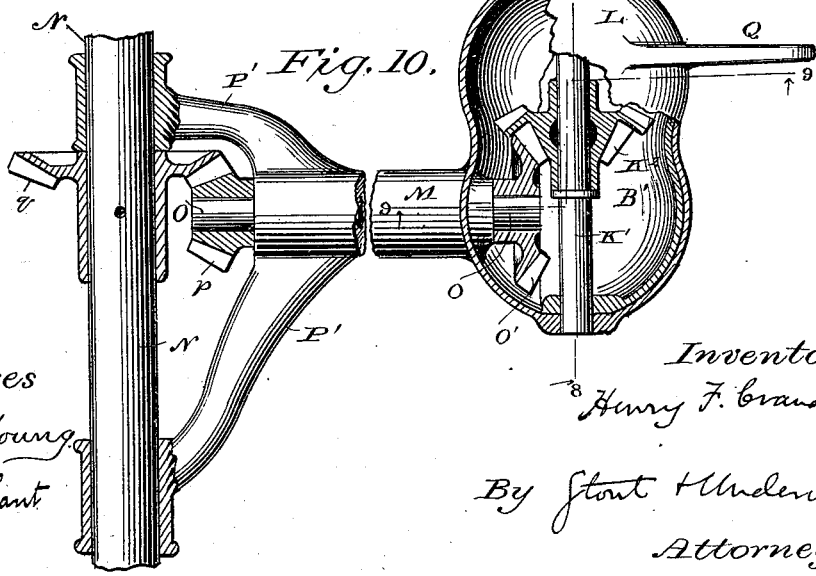

In the drawings, Figure 1 is an elevation of my device, the gear-wheels and connections at the base of the reel-standard being omitted. Fig. 2 is a side elevation of the locking mechanism. Fig. 3 is a front view of the same, partly broken away. Fig. 4 is a plan of the same, partly in section, on line 4 4, Fig. 2; and Fig. 5 is a rear elevation of the same. Fig. 6 is a detail of the base of the reel-standard, partly in section. Fig. 7 is a section on line 7 7 of Fig. 6, with bevel-wheels and shafts removed. Fig. 8 is a section on line 8 8 of Figs. 9 and 10. Fig. 9 is a section on line 9 9 of Fig. 10. Fig. 10 is a broken plan view of the connection between the reel-standard and jack or arm that carries the reel-shaft, partly in section, on the line 10 10 of Fig. 8. Fig. 11 is a detail section on line $x\ x$ of Fig. 1. Fig. 12 is a detail view of the latch.

A is the seat-plank of the harvester, and A' is the reel.

B is the reel-standard, which is of hollow metal and is trifurcated at its bottom, two of the branches $a\ a$ serving to receive a shaft C, by which it is pivoted to a base-block D, the lugs $b\ c\ d$ of which form bearings for the shaft C, while lug $b$ extends above the bearing of shaft C, and on its upper end is formed another bearing $e$ for the driving-shaft E, which latter carries a bevel gear-wheel F for engagement with the toothed rim $f$ of a bevel gear-wheel G on shaft C, which gear-wheel G has another set of teeth $g$ for engagement with a bevel gear-wheel H on the lower end of a shaft I, that passes down through standard B and has its lower bearing in branch $a'$ thereof. The upper end of shaft I also carries a bevel gear-wheel K, which is located in a housing B', cast with or otherwise formed on the upper end of the standard B, and through this housing and a corresponding housing L that covers it is passed a shaft K', that carries a bevel gear-wheel $K^2$, that meshes with the wheel K. The housing L is on one end of the arm M of the reel-shaft N, and this arm M is hollow to receive a shaft O, that carries a bevel-wheel at each end, one O' for meshing with wheel $K^2$ and the other $p$ meshing with a bevel-wheel $q$ on shaft N. The arm M has forks P' P', and the end of each fork has a bearing for the shaft N.

Projecting from the rear upper portion of housing L is another arm Q, forming an extension of arm M, which is connected by a link R with a casting S, that is secured to hand-lever S', and the casting S is pivoted to another casting T by a bolt T', which secures the casting T to the standard B, which standard is formed with a flange $B^2$ to support the casting T.

Between the head of bolt T' and the casting S is a spring $t$, the inner end of which bears against the outer face of casting S. The bolt T' screws into standard B and has a shoulder at the beginning of the screw-threaded portion that bears upon a washer $t'$, which washer and bolt hold the casting T in its place on the standard B without interfering with the rocking motion of said casting on said bolt.

The opening in casting S through which the bolt T' passes is enlarged at its edges to permit lateral play of casting S. In the front portions of its face adjacent to the casting T the flange $B^2$ is formed with indentations $B^3$ to receive one end of a latch U that is carried by the casting T and slides in a bearing $T^2$ in the forward end thereof. The forward end of casting S is fan-shaped and rounded from top to bottom, and this end slides in a slot in the latch U, and on the rear end of the casting T, which is widened for that purpose, are formed downwardly-projecting teeth R' for engagement with an upwardly-projecting tooth $R^2$ on casting S.

The lower rear corner of casting T is connected with the seat-plank A by a link W, that passes through a slot $W^3$ in a flange $W^2$, projecting from the standard B, and said link W carries a spiral spring W', whose upper end bears against the under side of said flange W², and whose lower end bears against a collar W⁴ on said link W and has a constant tendency to throw the top of the standard forward, which is resisted and controlled by the link W and casting T.

The operation of the device is as follows: The standard B is supported in its vertical position, as shown in Fig. 1, by the link W, bolt T', casting T, and connections, which casting T is held in position relatively to the reel-standard by the latch U and flange B², in one of the indentations B³ of which flange the latch is engaged, and the lever S' and its casting S are held by its tooth R², which engages with teeth R' on casting T. Now, if it is desired to lift the reel, the lever S' is simply depressed, and the arm Q, being depressed, lifts the arm M of the reel-shaft, and if it is desired to tip the standard B forward or backward the lever S' is pressed toward the casting T, and, the teeth R' R² forming a fulcrum, spring t is compressed, the latch U is withdrawn from engagement with flange B², and the said flange B² will be free to move with the standard as the standard B is drawn back or forward, the slot in the flange W² permitting the standard B to recede from or approach the link W as the former is tilted, the amount or degree of tilt forward being limited by the flange W² coming in contact with the casting T, and the backward tilt is resisted by the compression of the spring W' by flange W², and is limited by the contact of the link W with flange W² at the end of slot W³ nearest the standard B, and when the standard B has been properly adjusted it is only necessary to release the lever S', when the latch U will be forced into one of the indentations B³ by the action of the spring t on the casting S, and the parts will be locked in the desired position. When the lever S' is depressed to lift the reel-shaft, the tooth R² of casting S is permitted to slide over the teeth R' of casting T by the yield of the spring t; but as soon as the lever is released the teeth engage with each other to lock the parts in adjustment until the lever is drawn aside against the resistance of spring t far enough to permit the teeth to clear each other, when the reel can be dropped to the desired position, the lever released, and the parts again locked together. The lateral play of the casting S is limited in one direction by a guard V.

Having thus described my invention, what I claim as new, and desire to secure by Letters Patent, is—

1. The combination, with the reel-standard pivoted at its base and casting pivoted to said standard on a pivot parallel to the pivot of the standard, of a link connecting said casting with the seat-plank, a spring surrounding said link and suitably supported at its lower end, and a slotted horizontal flange projecting from the standard and straddling the link above the spring and bearing against the upper end thereof, and means for locking the casting in adjustment relatively to the reel-standard, substantially as set forth.

2. The combination, with the reel-standard pivoted at its base and a flange fixed to the reel-standard and projecting in the plane of motion of the standard and having horizontal indentations one above another, of two castings parallel to said flange, a bolt pivoting them to the standard and to each other, a spring surrounding said bolt and interposed between the head of said bolt and the outer casting, an operating-lever connected to the outer casting, a link connecting the rear end of the inner casting to the seat-plank, and a latch located in the front end of the inner casting and controlled by the outer casting for engagement with said indentations, and thereby locking the inner casting to the said flange of the standard, substantially as described.

3. The combination, with the reel-standard pivoted at its base and the arm of the reel-shaft pivoted to said reel-standard, of two castings pivoted side by side on said reel-standard, one casting provided with a lever and linked to an extension on the rear end of the arm of the reel-shaft and the other casting linked to the seat-plank, and connecting mechanism, substantially as described, between the two castings, whereby the reel-standard and arm of the reel-shaft may be adjusted either separately or together by one and the same lever, as set forth.

In testimony that I claim the foregoing I have hereunto set my hand, at Milwaukee, in the county of Milwaukee and State of Wisconsin, in the presence of two witnesses.

HENRY F. CRANDALL.

Witnesses:
H. G. UNDERWOOD,
N. E. OLIPHANT.